Figure 1:
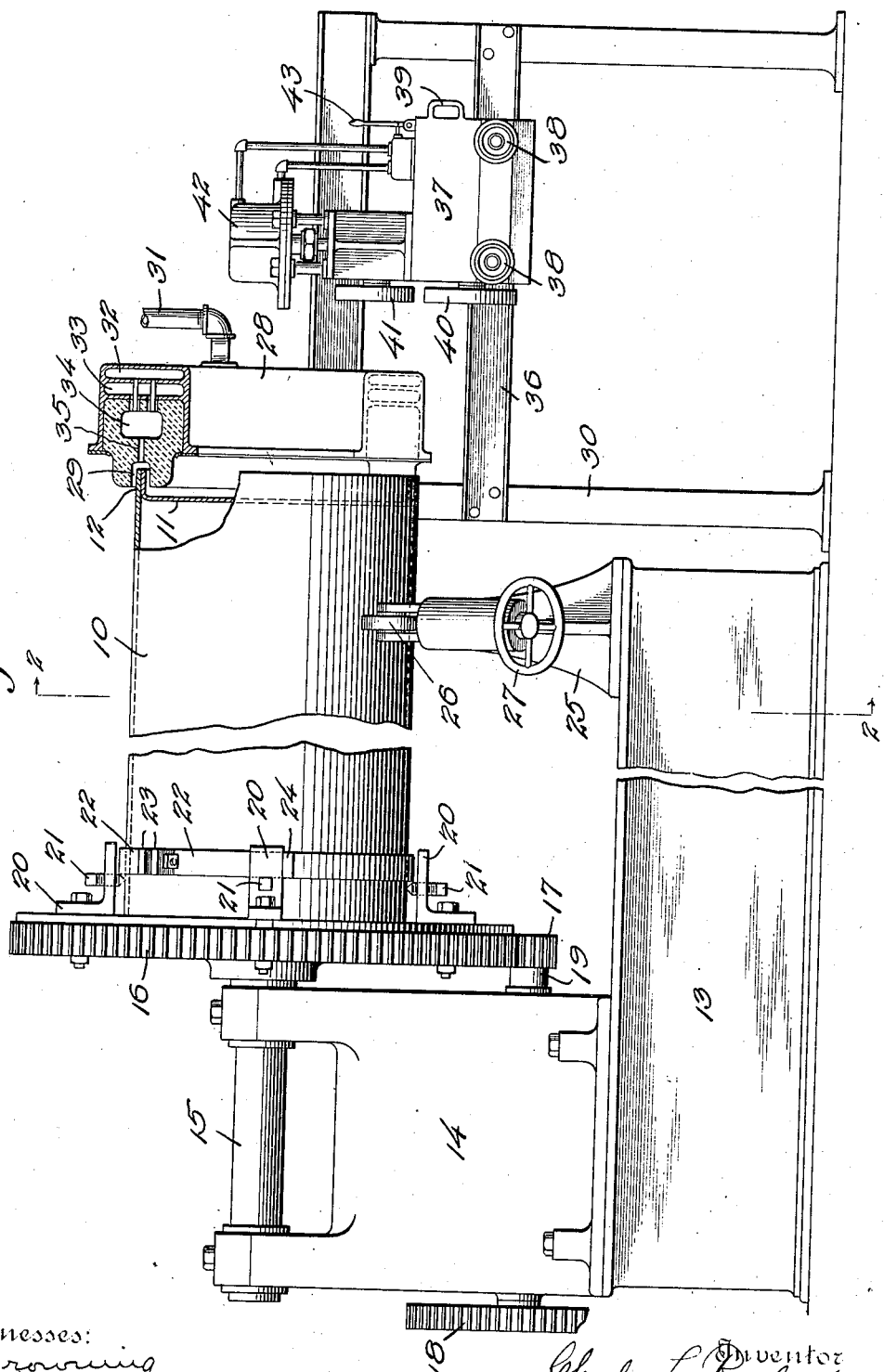

C. L. ROWLAND.
METAL WORKING APPARATUS.
APPLICATION FILED MAY 18, 1914.

1,217,221.

Patented Feb. 27, 1917.
2 SHEETS—SHEET 1.

C. L. ROWLAND.
METAL WORKING APPARATUS.
APPLICATION FILED MAY 18, 1914.
1,217,221.
Patented Feb. 27, 1917.
2 SHEETS—SHEET 2.
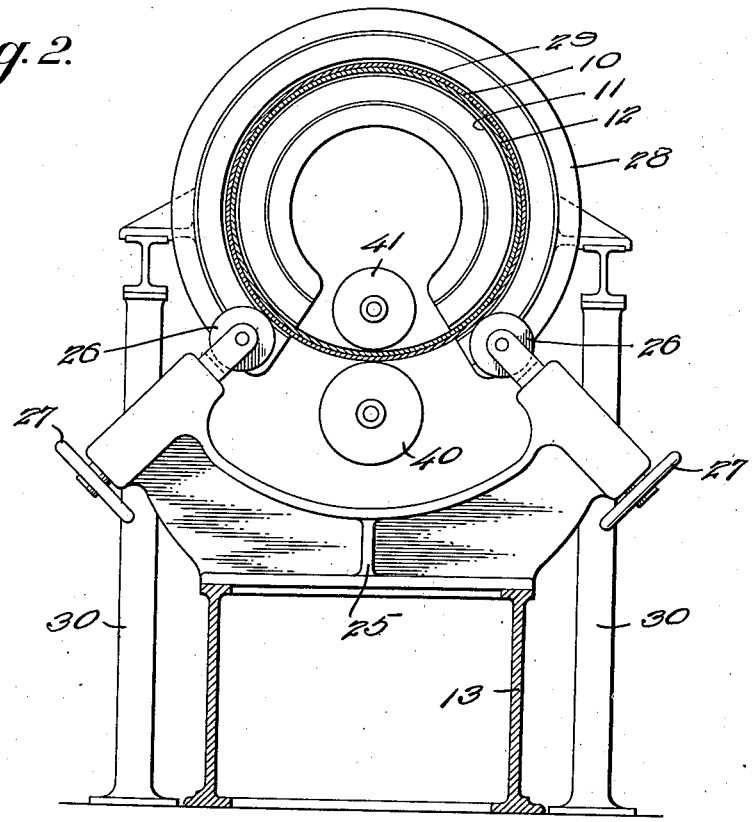
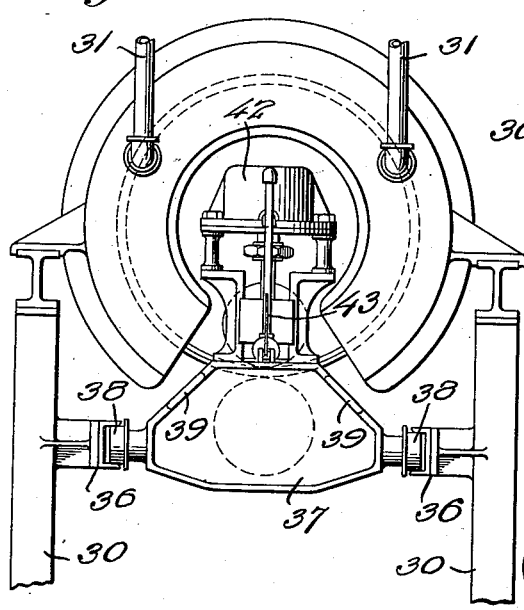
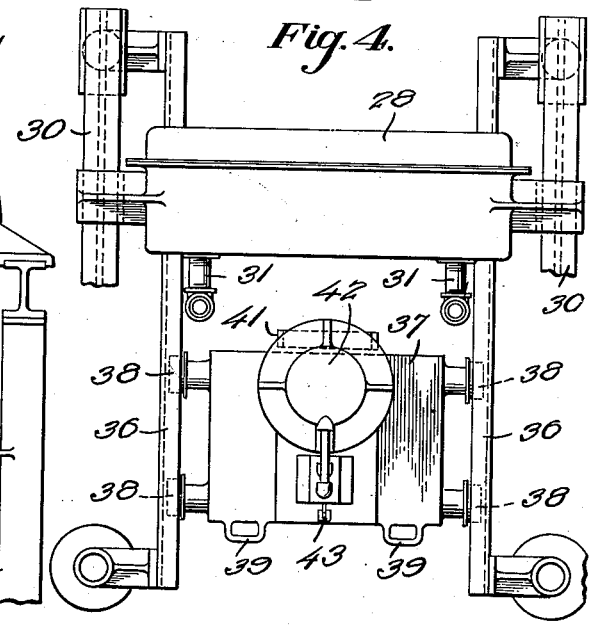
Witnesses:
L. F. Browning
C. M. Sherman
Inventor
Charles L. Rowland
By his Attorney
Edward C. Davidson

UNITED STATES PATENT OFFICE.

CHARLES L. ROWLAND, OF CARBONDALE, PENNSYLVANIA, ASSIGNOR TO AMERICAN WELDING COMPANY, OF CARBONDALE, PENNSYLVANIA, A CORPORATION OF PENNSYLVANIA.

METAL-WORKING APPARATUS.

1,217,221.  Specification of Letters Patent.  Patented Feb. 27, 1917.

Application filed May 18, 1914. Serial No. 839,440.

*To all whom it may concern:*

Be it known that I, CHARLES L. ROWLAND, a citizen of the United States, residing in Carbondale, county of Lackawanna, State of Pennsylvania, have invented certain new and useful Improvements in Metal-Working Apparatus, of which the following is a specification.

This invention relates to metal working apparatus, and has particular reference to the working of cylindrical, disk, or annular bodies and the like, such as require heating before or during manipulation.

One object of the invention is to provide a new apparatus for heating and manipulation by which articles having a generally circular form and made up of relatively thin metal may be easily worked and handled in the processes of brazing, welding, forming, and the like.

Another object is to provide an apparatus adapted to carry out the invention in the simplest manner; and still other objects will appear in the following description and claims.

Referring to the drawings:

Figure 1 is a side elevation of the machine, partly broken and sectional;

Fig. 2, a section on line 2—2 of Fig. 1 looking in the direction of the arrows;

Fig. 3, an end elevation of the furnace end of the machine; and

Fig. 4, a plan view of the furnace.

The drawings disclose a machine for the welding of heads to a cylindrical shell to form a tank, this particular machine having been selected as a typical mechanism illustrating the invention. It is understood, of course, that brazing and forming operations are also included within the scope of the machine.

In this particular illustration of the machine, the shell to which a head is to be welded is shown at 10, and the head at 11, in Fig. 1, these two parts meeting to form an annular flange as shown at 12. The shell and head are supported and rotated by a work holder not unlike a lathe head, the parts of which comprise a bed 13, a head 14 bolted to the bed, and a shaft 15 carrying a face plate 16, equipped with teeth as shown. The face plate and shaft are rotated by gears 17 and 18 carried upon the same shaft 19, the gear 18 being driven by any suitable prime mover. However, the shell or cylinder may, of course, be mounted and rotated in any appropriate way.

A suitable chucking device is provided for the face plate and is in the present instance formed of angle irons 20, 20, 20 bolted to the face plate and provided with set screws 21, 21, 21. A pair of semi-circular straps 22, 22 provided with ears 23, 23 is adapted to be clamped to the shell 10 as shown. Each strap is provided with a radial lug, one of which is shown at 24 in Fig. 1, which abut the corresponding angle irons 20, and form a positive drive for the straps.

The work is further supported by a slidable frame, 25 resting upon the bed 13. This frame as best shown in Fig. 2, carries a pair of supporting rolls 26, 26 which are radially adjustable with respect to the work center by hand wheels 27, 27.

With the mechanism thus described, the shell and head may be mounted in the workholder and rotated at any desired speed. The application of a welding heat to the flange 12 is provided for by a specially formed furnace indicated at 28. This furnace is preferably in the form of an interrupted ring, as best shown in Figs. 2 and 3, and the open section of the ring is at the lowest part of the furnace. As shown in Figs. 1 and 2, the mouth 29 of the furnace is curved to conform to the arc of a circle, corresponding to the circular dimension of the flange 12, and the furnace is suitably mounted upon a framework 30, located at the right of the bed 13 so that the furnace mouth 29 is concentric with the flange 12 and may be adjusted with its mouth 29 inclosing the flange 12.

The furnace may be of any appropriate type. In the present instance, a gas furnace is shown. This particular furnace is provided with suitable pipes 31, 31, a gas chamber 32, air chamber 33, mixing chamber 34, and a throat 35 connecting to the furnace mouth 29.

It will be noticed that when the furnace is adjusted to heat the flange 12, more than three-quarters of the flange is positioned within the furnace mouth, and the rotation of the flange while the furnace is in operation causes all parts of the flange to be heated uniformly. When the flange has been brought to a welding heat, suitable metal working appliances may be brought to bear upon the metal without altering the relations of the work and furnace. This is made possible by adapting the metal working appliances to operate in the open section of the furnace ring.

For this purpose, the framework 30 is equipped with a pair of U-rails 36, 36 in longitudinal alinement with the bed 13. These rails support a carriage 37 which is gibbed to the rails by wheels 38, 38. The carriage is fitted with handles 39, 39, by which it may be drawn free from the furnace as shown in Figs. 1 and 4, or moved into its operative position as shown in Figs. 2 and 3, when it nests within the open section of the furnace.

In the present instance, the carriage is equipped with a pair of rolls, a fixed roll 40 and a movable roll 41, the latter being movable by hydraulic or other pressure supplied to a cylinder 42 from a hand valve 43 connected to a suitable source of fluid pressure. As shown in Fig. 2, these rolls may operate upon the metal simultaneously with the furnace.

As the flange, by the provision for its continuous rotation, is subject to the continuous and uniform action of both the furnace and the pressure rolls, a great deal of work especially with thinner metals may be performed on this machine that is not possible otherwise.

By providing interchangeable furnaces having mouths of different radii, and substituting other forms of metal working rolls, a great variety of novel work may be done with this machine. As shown, the machine is also adapted for face plate work, on disks and the like, as well as cylindrical objects. Further, it may be used in any metal manufacture in which a circular zone of metal is to be worked, either in a joining or a forming operation. I do not therefore restrict my invention to the particular mechanism shown and described.

In practice a head may be quickly welded in a cylinder. When the metal is raised to proper or suitable temperature the furnace may be withdrawn and the welding rolls put into operation, the welding being completed at one heating. The turning of the flanges either out or in by suitable forming rolls, may be accomplished by one heating and therefore the furnace may be withdrawn during such operation. This is of course necessary where the throat of the furnace is not of sufficient dimensions to accommodate, without injury to its walls, the formed flange or crimp.

So far as I know it is broadly new to provide a circular heating zone continuous substantially the whole of the circle and concentric to the work or metal and to revolve one relatively to the other, in conjunction with appropriate welding devices acting upon the heated zone of the metal.

I claim:

1. In combination, a furnace having a mouth curved to conform to the arc of a given circle, a metal working roll having its working surface positioned upon the same circle, and a rotating workholder having its axis concentric with the furnace mouth.

2. In combination, a furnace having a mouth curved to the arc of a circle, a metal working roll having its working surface positioned upon the same circle and a rotatable workholder adapted to hold a cylinder to be operated upon having its axis concentric with the furnace mouth.

3. In combination, a furnace having a mouth curved to conform to the arc of a given circle, metal working rolls having opposed working surfaces positioned upon the same circle, and a rotatable workholder having its axis concentric with the furnace mouth.

4. In combination, a furnace having a mouth curved to conform to the arc of a given circle, a metal working roll having its working surface adapted to be positioned upon the same circle, a rotatable workholder having its axis concentric with the furnace mouth, and means to move the roll to an inoperative position and away from close proximity to the furnace mouth.

5. In combination, a furnace having a mouth curved to conform to the arc of a given circle, metal working rolls having opposed working surfaces adapted to be positioned upon the same circle, means to vary the pressure exerted by the rolls, and a rotatable work-holder adapted to hold a cylinder whose end is to be heated and having its axis concentric with the furnace mouth.

6. In combination, an annular furnace having the form of an interrupted ring, a metal working device nested in the open section, a rotator located opposite the said furnace and adapted to hold a cylindrical body concentric with the furnace.

7. In combination, an annular furnace having the form of an interrupted ring, a metal working device nested in the open section, a rotatable workholder located opposite the said furnace and device and having its shaft concentric with the furnace, and means to move the said device into and out of its nesting position.

8. In combination, a furnace having an arc shaped mouth, a metal working device, the said furnace mouth and device being located in substantially the same plane, and a rotatable workholder having its shaft located co-axially with the furnace and adapted to present the work to said furnace mouth and said device.

9. In combination, a workholder adapted to rotate the work, a furnace adjustable to abut the work, and equipped with a mouth forming the main part of a circle concentric with the workholder, metal working rolls having their working surfaces in circular alinement with the furnace mouth, a frame for the rolls, and a mounting for the frame and rolls by which they may be moved relatively to the furnace.

10. In a machine for welding tanks, a workholder, a circular furnace, a metal working device adapted to coact with the furnace, and means to rotate the workholder whereby the work may be subjected to the action of the said furnace and working device.

11. In a machine for welding tanks, a workholder adapted to support and to rotate the shell and head of a tank, a furnace having an annular mouth substantially surrounding the whole of the flange joint to be welded concentric with joint of the shell and head and adapted to heat the joint during the rotation of shell and head, and a metal working device adapted to act upon the joint to effect a weld of the shell and head after they have been brought to a welding heat.

12. In a machine for welding tanks, a workholder adapted to support and to rotate the shell and head, a circular furnace surrounding substantially the whole of the joint and adapted to bring the joint to a welding heat, and a welding device adapted to weld the joint during the said rotation and while the furnace is still supplying heat to the joint.

13. In combination, means for supporting and rotating an article to be worked, means for creating a concentric heating zone occupying substantially a full circle and metal working devices disposed in an arc concentric to that of the heating zone.

14. In combination, means for supporting and rotating an article to be worked, means for creating a concentric heating zone occupying substantially a full circle and metal working devices disposed in an arc concentric to that of the heating zone and in the plane thereof.

15. In combination, a furnace having a mouth curved to conform to the arc of a given circle, metal working devices having opposed working surfaces adapted to be positioned upon the same circle and means for causing them to exert a pressure upon the heated metal while same is being mechanically rotated.

16. In combination, an annular furnace having the form of an interrupted ring, a metal working device coöperating therewith, and means for supporting the metal to be worked and for rotating it around an axis concentric with the furnace.

In testimony whereof, I have hereunto subscribed my name.

CHARLES L. ROWLAND.

Witnesses:
MARY W. WALLACE,
L. F. BROWNING.